April 15, 1958     R. E. BROWN     2,830,473
SPEED REDUCING ACCESSORY FOR RATE-OF-TURN TEST TABLE
Filed Nov. 12, 1954     2 Sheets-Sheet 1

RALPH E. BROWN,
*INVENTOR.*

BY

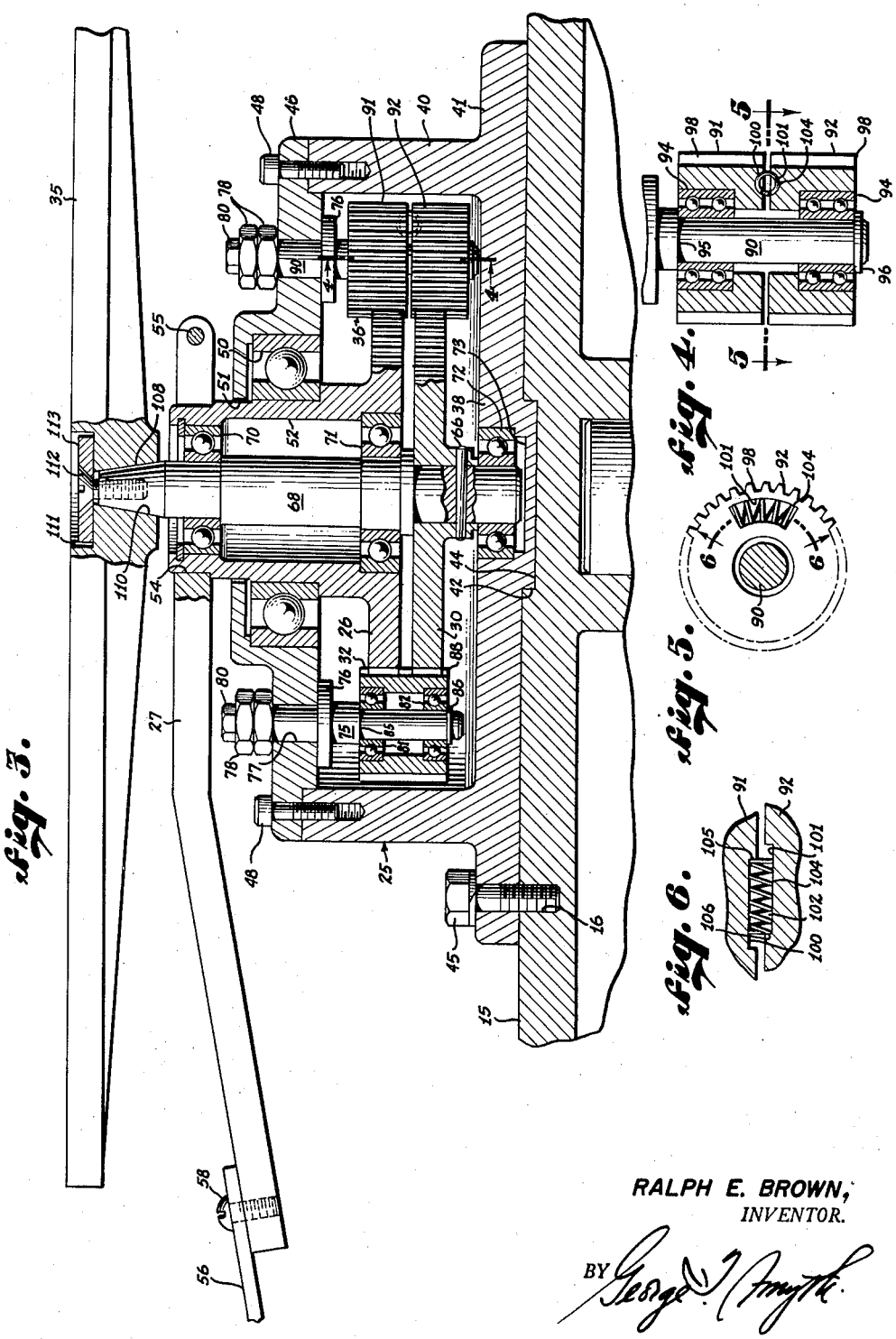

United States Patent Office 2,830,473
Patented Apr. 15, 1958

2,830,473
SPEED REDUCING ACCESSORY FOR RATE-OF-TURN TEST TABLE

Ralph E. Brown, Los Angeles, Calif., assignor to Genisco, Inc., Los Angeles, Calif., a corporation Application November 12, 1954, Serial No. 468,231

6 Claims. (Cl. 74—802)

This invention relates to well known apparatus providing a rotary test table for testing the response of various devices to rotation and the invention is directed to the problem of adapting such an apparatus for making tests at expectionally low rates of rotation on the order of only a few turns in a period of twenty-four hours. Such an apparatus must be capable of relatively high rates of rotation and the lowest limit of its range of rotation is typically many times this low order of rotation. The invention meets this by providing an accessory that may be quickly and conveniently added to the usual test apparatus to carry out test operations at the desired exceptionally low rates of rotation.

This accessory includes an auxiliary test table to be used instead of the main test able of the apparatus and a feature of the invention is that preparation for the exceptionally low speeds of operation requires merely bolting the accessory onto the main test table and anchoring a radial arm of the accessory. When the accessory is so mounted on the apparatus, the auxiliary test table is actuated by the main testing table at the desired exceptional low rate of rotation and this exceptionally low rate may be varied through a substantial range of rotation by manipulation of the controls of the main apparatus in the usual manner.

The accessory incorporates two concentric gears of substantially the same diameter positioned face to face, the two gears having different numbers of teeth. One gear is immobilized by the anchored radial arm and the other gear actuates the auxiliary test table. Planetary pinion means journalled in the accessory structure and moved thereby in a concentric orbit meshes with both of these gears to keep the teeth of the two gears in alignment with each other at at least one circumferential point. This arrangement causes the free gear to rotate at a rate determined by the difference in the number of teeth.

A feature of the preferred practice of the invention is that one gear has two hundred teeth and the other gear one hundred and ninety-eight teeth. One advantage of this numerical relationship is a highly desirable reduction ratio on the order of one hundred to one, the auxiliary test table rotating at one hundredth the rate of rotation of the main test table. Another inherent advantage in this particular arrangement is that the difference in the number of teeth is an even number and therefore permits the use of two pinions at diametrically opposite points on the peripheries of the two gears. A further advantage is that in permitting the use of two pinions, the invention makes it possible to use one pinion for eliminating backlash, as will be explained. Error arising from backlash increases to a serious extent as the rate of rotation is reduced to the contemplated exceptionally low magnitude.

The various features and advantages of the invention will be understood from the following detailed description considered with the accompanying drawings.

In the drawings, which are to be regarded as merely illustrative:

Figure 3 is an enlarged sectional view of the accessory mounted on the main test table of the apparatus;

Figure 4 is a sectional view of the anti-backlash pinion taken as indicated by the line 4—4 of Figure 3;

Figure 5 is a transverse section taken as indicated by the line 5—5 of Figure 4;

Figure 6 is a fragmentary section taken as indicated by the arcuate line 6—6 of Figure 5.

Figure 1 shows, by way of example, an apparatus generally designated by numeral 10 in the form of a rate-of-turn test table constructed in the manner disclosed by my patent application, entitled Variable Seepd Turntable, Serial Number 344,721, filed on March 26, 1953, which disclosure is hereby incorporated in the present disclosure by reference.

Figure 1:
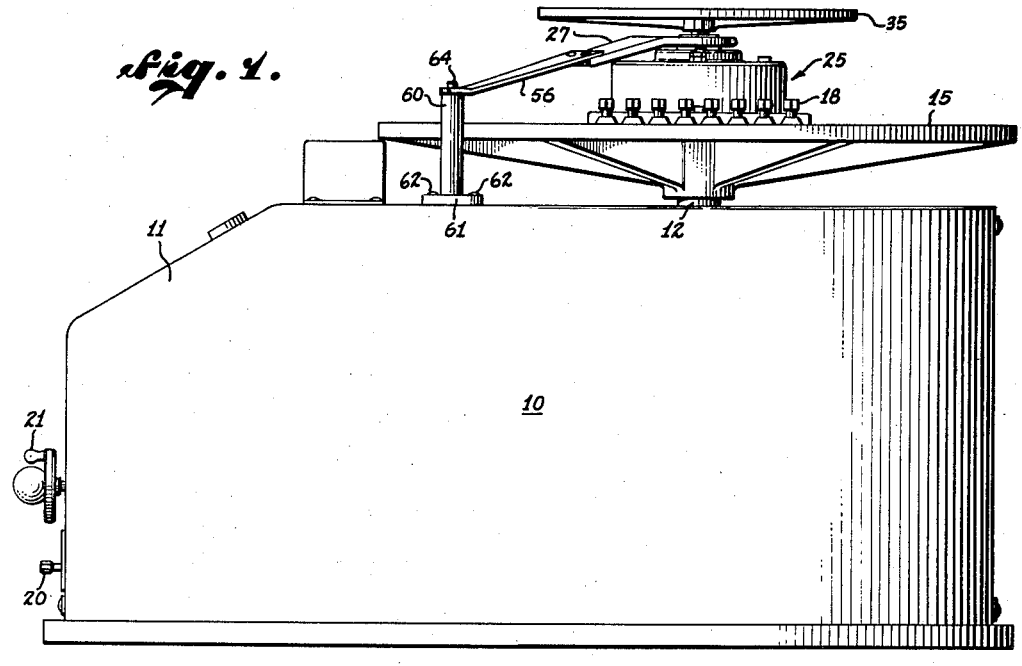
Figure 1 is a side elevation of a rate of turn testing apparatus with the accessory of the present invention mounted thereon.

The apparatus 10 has a housing 11 which encloses mechanism for actuating an upright shaft 12 on the upper end of which is mounted a suitable test table 15. The test table 15 has the usual numerous tapped bores 16 to permit test objects to be secured thereon and suitable wiring is provided to permit the test objects to be connected with electrical circuits outside of the apparatus. For this purpose suitable electrical terminals 18 on the test table 15 are connected to corresponding slip rings (not shown) on the upright shaft 12 and brushes (not shown) associated with the slip rings are connected to corresponding terminals 20 on the front of the housing 11.

The rate of rotation of the test table 15 is set by a crank 21 which controls a variable speed transmission (not shown) inside the housing 11. In this instance, the variable transmission is of a type which utilizes balls in movable cages between overlapping discs to transmit rotation from one disc to another. Rotation of the crank 21 varies the positions of the balls relative to the axes of the overlapping discs and thereby varies the rate of rotation of the test table 15.

The principal parts of the accessory that comprises the present invention include: a circular base, generally designated 25, in the form of a housing adapted for mounting on the test table 15 concentrically thereof for rotation therewith; a first gear 26 journalled in the accessory housing 25 concentrically of the axis of rotation of the test table 15; means including a radial arm 27 to hold the gear 26 stationary; a second similar gear 30 concentric to the first gear and of substantially the same diameter, the two gears having different numbers of teeth; at least one pinion 32 rotatably mounted in the accessory housing 25 to be carried thereby in an orbit around the peripheries of the two gears 26 and 30, this pinion being in mesh with both of the gears to maintain alignment of the teeth of the two gears at one point, this point travelling circumferentially around the two gears; and an auxiliary rate-of-turn test table 35 connected with the second gear 30 for actuation thereby.

In the preferred practice of the invention it is contemplated that the fixed first gear 26 will have 200 teeth and that the second free gear 30 will have 198 teeth so that one complete rotation of the accessory housing 25 will cause the second free gear 30 to advance relative to the fixed gear by an amount corresponding to two teeth of the free gear. Thus one hundred rotations of the main test table 15 of the apparatus 10 will be required to cause the free gear 30 to make one complete rotation. The preferred practice of the invention further includes a second pinion 36 which is preferably of a construction to eliminate backlash in the actuation of the auxiliary test table 35 by the main test table 15.

The accessory housing 25 may comprise a casting having a bottom wall 38 and an upright cylindrical wall 40 integral therewith, the bottom wall extending radially beyond the cylindrical wall to form a circumferential base flange 41. The bottom wall 38 of the accessory housing 25 is formed with a central boss 42 on its underside that fits into a corresponding concentric recess 44 in the main test table 15, the boss and recess cooperating to center the accessory housing 25 on the main test table 15. The accessory housing 25 may be adapted for mounting on the main test table 15 in any quickly detachable manner, for example, by means of cap screws 45 extending through the base flange 41 into tapped bores 16 of the main test table.

The accessory housing 25 may be closed by a ring shaped cover 46 that is anchored to the upright cylindrical wall 40 by suitable screws 48. This cover 46 incorporates a suitable ball bearing 50 positioned at its central opening 51.

The first stationary gear 26 is hollow and preferably is unitary with an upright sleeve 52 that is journalled in the ball bearing 50, the previously mentioned anchoring arm 27 being fixedly connected with the upper end of the upright sleeve. In the construction shown, the arm 27 has a circular aperture 54, embracing the upper end of the sleeve 52 and the end of the arm is split to permit the arm to be tightened on the sleeve, the split ends of the arm being interconnected by a tightening screw 55 for this purpose.

Figure 2:
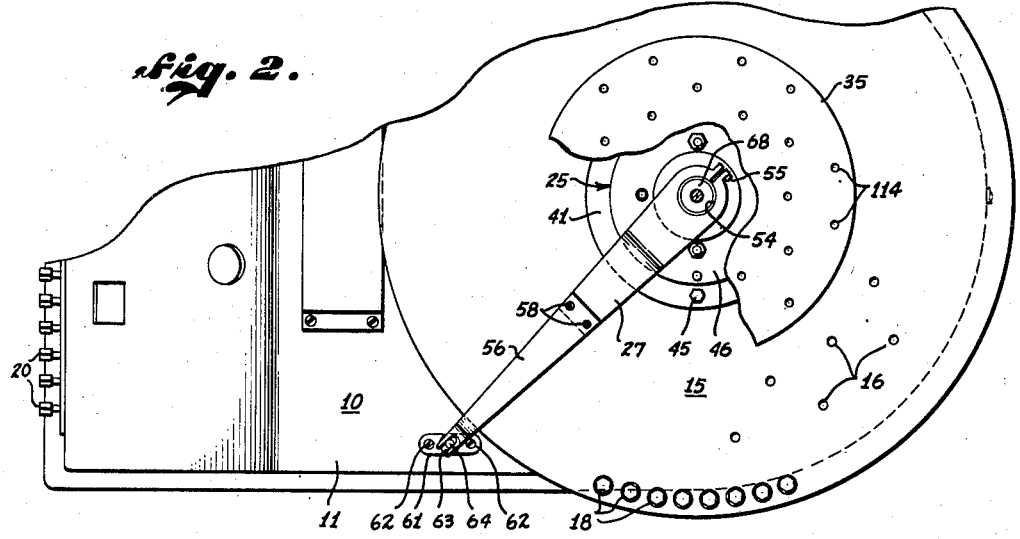
Figure 2 is a fragmentary plan view of the accessory-equipped apparatus with parts broken away.

In this instance the arm 27 has an extension 56 fixedly secured thereto by screws 58 and this extension is suitably adapted for anchorage to the housing 11 of the apparatus 10. For this purpose a suitable anchor post 60 having a base flange 61 may be mounted on the apparatus housing 11 by suitable screws 62. The arm extension 56 is formed with a slot 63 at its end (Figure 2) and this slot straddles a screw 64 that may be tightened to rigidly connect the arm extension to the top of the anchor post 60.

As shown in Figure 3, the second free gear 30 may be mounted by a suitable cross pin 66 on an upright auxiliary shaft 68. The auxiliary shaft 68 is journalled in the sleeve 52 by a pair of ball bearings 70 and 71 and carries the auxiliary test table 35 on its upper end. Preferably the lower end of the auxiliary shaft 68 is also journalled in ball bearing 72 in a recess 73 in the bottom wall 38 of the accessory housing to give the upright shaft greater stability.

The first pinion 32 is mounted on a suitable spindle 75 having a radial flange 76. The spindle 75 extends through a bore 77 in the housing cover 46 and is secured by a pair of nuts 78 on its upper end. Preferably a cap screw 80 is threaded into the upper end of the spindle in pressure engagement with the pair of nuts 78 to provide additional rigidity and to insure against loosening of the spindle. The pinion 32 is mounted on the spindle 75 by means of two ball bearings 81 and 82, the upper ball bearing 81 being packed against a circumferential shoulder 85 of the spindle and the lower ball bearing 82 being held in place by a split retaining ring 86. The teeth 88 of the pinion 32 mesh with both the stationary gear 26 and the free gear 30 to keep the teeth of the two gears in alignment at the corresponding circumferential points of the two gears as the pinion moves in its orbit around the gears.

Since the difference in the number of teeth of the two gears 26 and 30 is an even number, alignment of the teeth of the two gears by the pinion 32 will also cause the teeth of the two gears to be aligned at a circumferential station diametrically opposite from the pinion 32. Therefore the second pinion 36 may be of similar construction to the first pinion to share the guiding load.

In the preferred practice of the invention, however, the second pinion 36 is constructed to serve primarily as means to eliminate backlash between the two gears 26 and 30.

The second pinion 36 may be mounted on a second spindle 90 that is similar to the first spindle 75 as indicated by the corresponding numerals to designate corresponding parts. The second pinion 36 is made in two separate sections 91 and 92 each of which is rotatably mounted on the spindle 90 by a corresponding double ball bearing 94. The upper double ball bearing 94 is backed against the circumferential shoulder 95 of the spindle and the lower ball bearing 94 is secured by a split retaining ring 96. The two pinion sections 91 and 92 are of the same configuration and have identical teeth 98.

The upper pinion section 91 is formed with an arcuate recess 100 on its under face and the lower pinion section 92 in like manner is formed with an arcuate recess 101 on its upper face. These two recesses cooperate to form an annular space 102 in which is mounted a suitable compression coil spring 104. Preferably the coil spring 104 is slightly larger in diameter than the combined depth of the two recesses 100 and 101 to serve as a spacer for holding the two pinion sections 91 and 92 slightly spaced relative to each other. The spacing avoids excessive frictional resistance to relative rotation between the two pinion sections.

It is apparent that if one of the two pinion sections 91 or 92 is slightly advanced in rotation relative to the other, the coil spring 104 will be correspondingly compressed. Thus Figure 6 shows how one of the pinion sections advanced relative to the other with one end of the coil spring 104 seated against a shoulder 105 at one end of the recess 100 and with the other end of the spring seated against a shoulder 106 at the other end of the second recess 101. It is apparent that if the second pinion 36 is installed in mesh with the two gears 26 and 30 with the two pinion sections 91 and 92 displaced in opposition to the spring 104 in the manner illustrated by Figure 6, the two sections of the pinion will yieldingly urge the two gears 26 and 30 in opposite rotary directions against the teeth of the first pinion 32 and will thereby eliminate backlash.

The upper end of the auxiliary shaft 68 that extends upward from the free gear 30 is tapered as shown as 108 to fit into a correspondingly tapered axial bore 110 in the auxiliary test table 35. The auxiliary test table 35 has a concentric recess 111 at the upper end of the bore 110 and is anchored to the upright shaft 68 by a suitable screw 112 that engages a washer 113 in the recess.

The auxiliary test table 35 is provided with tapped bores 114 similar to the tapped bores 116 of the main test table 15, the purpose of the tapped bores 114 being to facilitate the anchorage of test objects on the auxiliary test table.

It is not necessary to include slip rings and corresponding brushes for connecting test objects on the auxiliary test table 35 with external circuits because the auxiliary test table rotates so slowly that loose wires may be used for this purpose. Thus suitable wires (not shown) may be suspended overhead for connection with test objects on the auxiliary test table 35. Such wires will twist with the rotation of the auxiliary test table, but so few turns are involved in each test operation that the twisting effect on the wires is not troublesome.

The manner in which the described accessory serves its purpose may be readily understood from the foregoing description. It is apparent that the anchor post 60 may be permanently mounted on the housing 11 of the apparatus 10 without interfering with the function of the main test table 15. Whenever it is desired to employ the accessory for a test at an exceptionally low rate of rotation, the accessory is quickly mounted on the main test table 15 by means of the cap screws 45 and it is a simple matter to engage the extension 56 of the radial arm 27 with the anchorage post 60 to immobilize the gear 26 inside the accessory housing.

As the accessory is rotated by rotation of the main turn table 15, the first pinion 32 moves in an orbit around the fixed gear 26 and thereby causes the free gear 30 to rotate at a rate determined by the difference in the number of teeth on the two gears. The second pinion 36 takes out backlash. The speed of rotation of the auxiliary test table 35 may be varied at will by manipulating the crank 31 that regulates the speed of the main test table 15.

Although the now preferred embodiment of the present invention has been shown and described herein, it is to be understood that the invention is not to be limited thereto, for it is susceptible to changes in form and detail within the scope of the appended claims.

I claim:

1. An accessory for an apparatus having a rotary test table to adapt the apparatus for testing rotation-responsive devices at extremely low rates of rotation below the range of rotation of the test table of the apparatus, said accessory comprising: a base for mounting on said test table on the axis thereof for rotation therewith; a first gear and a second gear of substantially the same diameter rotatably supported by said base and positioned face to face, said two gears being coaxial with said base and journalled for rotation relative to the base, one of said gears having more teeth than the other; means to immobilize said first gear; an auxiliary test table connected with said second gear for rotation thereby; and pinion means journalled on said base in mesh with both said gears to align the teeth thereof as the pinion means moves with the base in an orbit around the two gears, thereby to cause said second gear and said auxiliary test table to rotate in accord with the difference in the number of teeth of the two gears.

2. An accessory as set forth in claim 1 in which said first gear is unitary with structure journalled in said base and said second gear is journalled in said structure.

3. An accessory as set forth in claim 1 in which said pinion means comprises a plurality of pinions, one of said pinions being a unitary pinion, another of said pinions having separate relatively rotatable parts in mesh with said two gears, said parts being yieldably connected to take up backlash between the two gears.

4. An accessory as set forth in claim 3 which includes a spring under stress between said two parts of the pinion to tend to rotate the two parts relative to each other.

5. An accessory as set forth in claim 4 in which said spring is a coiled spring; and in which said two parts have respective recesses therein cooperative to form a space enclosing said spring, whereby relative rotation between the two parts varies the effective length of said space thereby to vary the compression of said spring.

6. An accessory for an apparatus having a rotary test table to adapt the apparatus for testing rotation-responsive devices at extremely low rates of rotation below the range of rotation of the test table of the apparatus, said accessory comprising: a hollow base for mounting on said test table on the axis thereof; a hollow gear journalled in said base coaxially of said test table of the apparatus; an arm fixedly connected to said hollow gear for anchoring the hollow gear against rotation; a second gear of substantially the same diameter as said hollow gear and having a different number of teeth than the hollow gear, said second gear being positioned concentrically of the hollow gear; an auxiliary test table united with said second gear for rotation thereby, said auxiliary test table and said second gear being journalled in said hollow gear; a first solid pinion journalled in said hollow base for movement in an orbit around said two gears, said pinion being in mesh with both of said two gears to locally align the teeth of the two gears thereby to cause said second gear to rotate relative to said hollow gear at a rate determined by the difference in the number of teeth of the two gears; and a second pinion rotatably mounted in said base at a point diametrically opposite from said first pinion, said second pinion having two separately rotatable sections in mesh respectively with said two gears; and yielding means in said second pinion urging said two sections in opposite rotary directions to take up backlash between the two gears.

References Cited in the file of this patent

UNITED STATES PATENTS

| | | |
|---|---|---|
| 403,756 | Jetter | May 21, 1889 |
| 676,440 | Mills | June 18, 1901 |
| 692,177 | Burger | Jan. 28, 1902 |
| 1,777,490 | Hardie | Oct. 7, 1930 |
| 2,001,180 | Buckner | May 14, 1935 |
| 2,440,901 | Larson | May 4, 1948 |
| 2,583,954 | Kugler | Jan. 29, 1952 |

FOREIGN PATENTS

| | | |
|---|---|---|
| 473,246 | France | Sept. 14, 1914 |
| 774,327 | France | Sept. 17, 1934 |
| 1,091,658 | France | Nov. 3, 1954 |